(12) United States Patent
Suzuki et al.

(10) Patent No.: US 7,756,506 B2
(45) Date of Patent: Jul. 13, 2010

(54) METHOD AND SYSTEM FOR DISCONTINUOUS RECEPTION DE-SYNCHRONIZATION DETECTION AND RECOVERY

(75) Inventors: Takashi Suzuki, Ichikawa (JP); Zhijun Cai, Euless, TX (US); Wei Wu, Coppell, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 558 days.

(21) Appl. No.: 11/750,758

(22) Filed: May 18, 2007

(65) Prior Publication Data

US 2008/0287091 A1 Nov. 20, 2008

(51) Int. Cl.
*H04B 1/16* (2006.01)
*H04K 3/00* (2006.01)

(52) U.S. Cl. ............... 455/343.4; 455/502; 370/311; 370/350; 375/356

(58) Field of Classification Search ............ 455/343.4, 455/502; 340/7.34, 7.38; 370/311, 350; 375/356–358
See application file for complete search history.

(56) References Cited

U.S. PATENT DOCUMENTS

| | | |
|---|---|---|
| 2004/0004954 A1 | 1/2004 | Terry et al. |
| 2004/0087320 A1 | 5/2004 | Kim et al. |
| 2004/0185918 A1 | 9/2004 | Fan et al. |
| 2007/0293162 A1 | 12/2007 | Jaatinen et al. |
| 2008/0192703 A1* | 8/2008 | Suzuki ............... 370/335 |
| 2008/0285509 A1* | 11/2008 | Womack et al. ........ 370/329 |
| 2008/0287149 A1* | 11/2008 | Womack et al. ........ 455/466 |

FOREIGN PATENT DOCUMENTS

| | | |
|---|---|---|
| EP | 1 353 467 A1 | 10/2003 |
| EP | 1 499 144 A1 | 1/2005 |
| EP | 1 912 351 A1 | 4/2008 |
| WO | 03/049301 A2 | 6/2003 |
| WO | 2004/102801 A1 | 11/2004 |
| WO | 2007/052141 A1 | 5/2007 |

OTHER PUBLICATIONS

Examination Report for European patent Application No. 07109770.3-1237, Mar. 4, 2009.

* cited by examiner

*Primary Examiner*—Lee Nguyen
(74) *Attorney, Agent, or Firm*—Eckert Seamans Cherin & Mellott, LLC; Brij K. Agarwal, Esq.

(57) ABSTRACT

A method and apparatus for recovery from discontinuous reception desynchronization, the method having the steps of: determining a most recent time that an explicit message indicating a change from an old discontinuous reception period to a new discontinuous reception period was sent; adding to the most recent time that the explicit message was sent the old discontinuous reception period multiplied by an integer, where the integer is selected to ensure the results of the adding step occur after a present time; and sending a continuous reception command at the time found in the adding step.

18 Claims, 17 Drawing Sheets

METHOD AND SYSTEM FOR DISCONTINUOUS RECEPTION DE-SYNCHRONIZATION DETECTION AND RECOVERY

FIELD OF THE DISCLOSURE

The present disclosure relates to a long-term evolution (LTE) architecture, and in particular, to the application and maintenance of long discontinuous reception in a LTE architecture.

BACKGROUND

Long discontinuous reception (DRX) is a feature that will be implemented in a long term evolution (LTE) architecture. The implementation of long DRX preferably includes minimal signaling and is adapted to allow the user equipment (UE) a significant amount of time where it is not monitoring or measuring so that the UE can turn off its transmitter and receiver, thereby increasing battery life.

In LTE, turning off the transmitter is called discontinuous transmission or DTX and turning off the receiver is discontinuous reception or DRX.

In LTE, during DRX, a UE will periodically wake up for exchanges of messages or to make measurements. A DRX period or cycle is the time between UE awake times. The length of the DRX awake time is typically in the order of milliseconds.

With long DRX, the enhanced node B (eNB) knows when the UE will be awake and when it will not. The term "DRX desynchronization is meant to describe those times when the eNB does know exactly when the UE will be awake. There are situations when the UE is awake more than the eNB realizes and there are situations when the UE is awake less than the eNB realizes. These situations generally arise from miscommunications when the eNB signals to the UE to change the DRX. It may also arise when implicit DRX changes that are programmed in the eNB or UE are configured by the eNB in error. Such situations could, for example, include the application of a longer DRX value when no data activity has occurred for a certain period of time.

BRIEF DESCRIPTION OF THE DRAWINGS

The present disclosure will be better understood with reference to the drawings in which.

DETAILED DESCRIPTION

Figure 1:
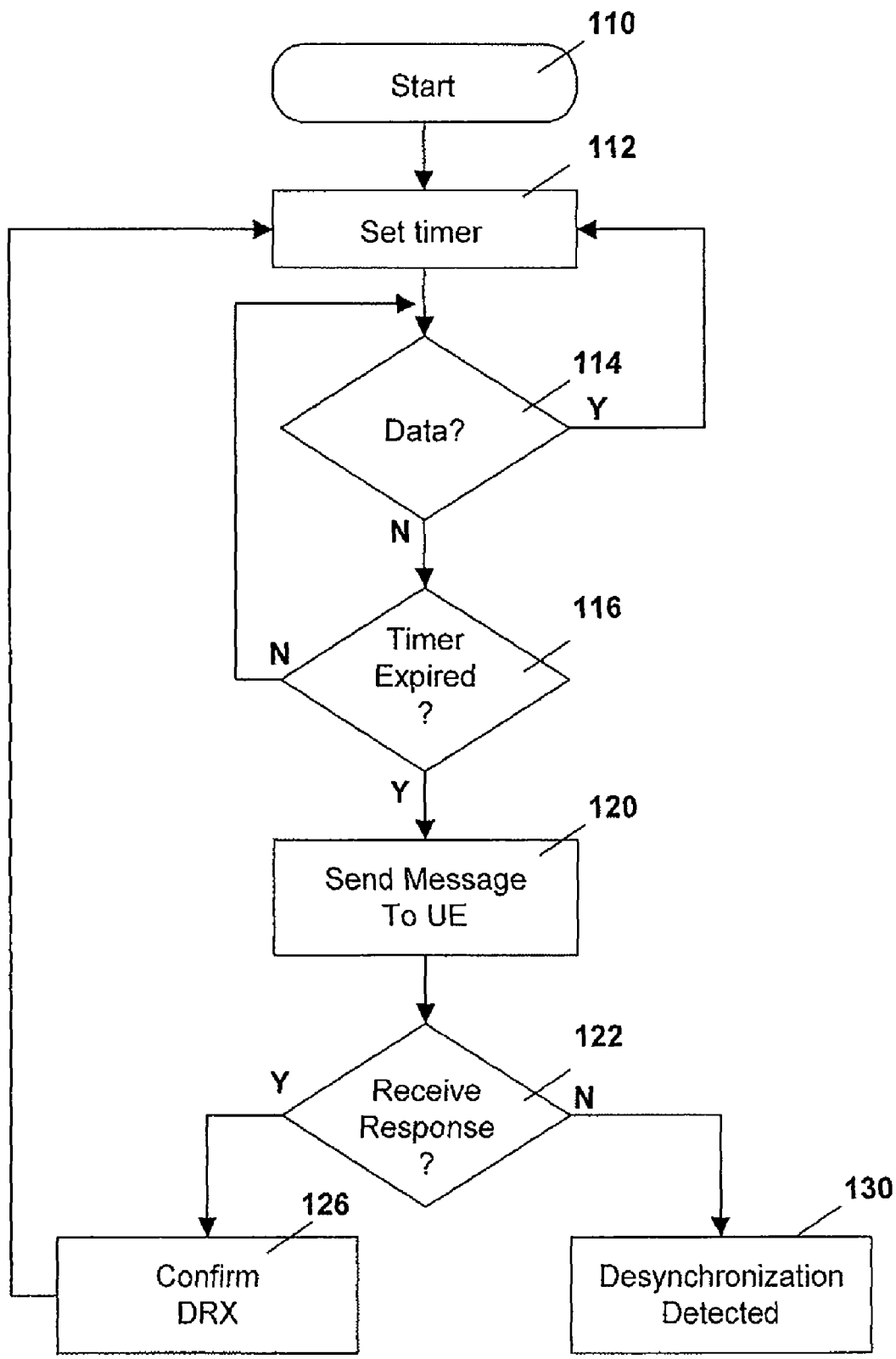
FIG. 1 is a flow diagram illustrating a method for detecting desynchronization through a timer-based solution on an eNB.

The present method and system provide for the detection of and recovery from DRX desynchronization.

In a first embodiment, desynchronization is detected through the use of a timer on one of or both of the user equipment and enhanced Node B. Specifically, an idle timer is started when data transmission finishes and if the idle timer expires, a message is sent. In one embodiment, the message contains a request for a current DRX period. In a further embodiment, the message contains the current DRX period and the receiving entity is adapted to compare the current DRX period received with the receiving entity's DRX period.

In a further embodiment, desynchronization is detected through a heartbeat message in which DRX information is either requested or sent at a periodic interval in order to allow desynchronization detection to occur.

In a further embodiment, desynchronization is detected through the piggybacking of DRX period information on periodic messaging being sent between the UE and the eNB.

In a further embodiment, desynchronization is detected through the sending of a DRX information request or DRX period information at a multiple of the shorter of the former DRX period and a new DRX period soon after a transition to the new DRX period. The multiple could be 1 or more. Specifically, upon a transition request being sent between the eNB and the UE to cause a DRX period change, the eNB subsequently sends a request for information from the UE at the shorter of the former DRX period and the new DRX period. Alternatively the eNB sends the DRX period that it expects the UE to be in in the subsequent message and thereby allows the UE to determine whether desynchronization has occurred. In this case, a desynchronization flag can be returned from the UE to the eNB and/or the UE may adjust its DRX period to the one received from the eNB.

In a further embodiment recovery from desynchronization due to explicit messaging between the eNB and the UE can occur by utilizing the time from the last known successful transmission between the eNB and the UE and a multiple of the old DRX period in order to send a continuous reception command to the UE. Specifically, utilizing the last known successful transmission time and multiples of the old DRX period should provide the eNB with a time that the UE is awake and the continuous reception command should thus be received by the UE.

In a further embodiment, recovery from desynchronization due to implicit DRX period changes can occur by utilizing the time of the second last transmission, along with the elapsed time since that transmission, to determine when the UE should be awake. The use of the elapsed time is adapted to let the eNB determine whether the DRX period is a short DRX period or a long DRX period in one embodiment. Specifically, in the case where the UE first transitions to a short DRX period when no data has been received for a first amount of time and then transitions to a longer DRX period when no data has been received for a second amount of time, the elapsed time since the second last transmission can be utilized to determine whether the UE is in a long DRX period or a short DRX period. Equations for determining the time that the UE should be awake are presented below.

The present disclosure therefore provides a method for recovery from discontinuous reception desynchronization, the method comprising the steps of: determining a most recent time that an explicit message indicating a change from an old discontinuous reception period to a new discontinuous reception period was sent; adding to the most recent time that the explicit message was sent the old discontinuous reception period multiplied by an integer, where the integer is selected to ensure the results of the adding step occur after a present time; and sending a continuous reception command at the time found in the adding step.

The present disclosure further provides a method for recovery from discontinuous reception desynchronization during implicit changing to a new discontinuous reception period, the method comprising the steps of: finding a time of a second last message that an enhanced Node B considers to be successfully sent; determining an elapsed time from the time of the second last message to the present time; deriving the longest transition time interval available based on the result of the determining step; adding the time of the second last message to the longest transition time interval available and further adding a discontinuous reception period duration utilized in the longest transition time interval available multiplied by an integer, where the integer is selected to ensure the results of the adding step are a time subsequent to a current time; and sending a continuous reception command at the time found in the adding step.

The present disclosure further provides an enhanced Node B adapted for recovery from discontinuous reception desynchronization, the enhanced Node B characterized by: means for determining a most recent time that the explicit message was sent; means for adding to the most recent time that the explicit message was sent the old discontinuous reception period multiplied by an integer, where the integer is selected to ensure the results of the adding means occur after a present time; and communications means for sending a continuous reception command at the time found by the adding means.

The present disclosure still further provides an enhanced Node B for recovery from discontinuous reception desynchronization during implicit changing to a new discontinuous reception period, the enhanced Node B characterized by: means for finding a time of a second last message that an enhanced Node B considers to be successfully sent; means for determining an elapsed time from the time of the second last message to the present time; means for deriving the longest transition time interval available based on the result of the determining means; means for adding the time of the second last message to the longest transition time interval available and further adding a discontinuous reception period duration utilized in the longest transition time interval available multiplied by an integer, where the integer is selected to ensure the results of the adding means are a time subsequent to a current time; and communications means for sending a continuous reception command at the time found by the adding means.

Various techniques for desynchronization detection are discussed herein.

Timer Based Detection

One method for detection of desynchronization is to utilize a timer on the enhanced node B. Reference is now made to FIG. 1.

FIG. 1 illustrates a flow diagram for a method to detect desynchronization utilizing a timer based solution. The process starts at step 110.

The process then proceeds to step 112 in which a timer is set. As will be appreciated by those skilled in the art, the timer can be a count-up timer or a count-down timer and various means for implementing timers would be known to those skilled in the art.

The process then proceeds to step 114 in which a check is made to see whether or not data has been received at the eNB for the UE. As will be appreciated by those skilled in the art, if data is received, then the eNB will need to communicate with the UE in order to convey the data and desynchronization could be detected if the UE did not respond to the data transmissions. Thus, in this case, from step 114 if data is received for the UE, the process proceeds back to step 112 in which the timer is again set.

Conversely, if data is not received in step 114 the process proceeds to step 116 in which it checks to see whether a timer has expired. If the timer has not expired, the process proceeds back to step 114 in which a check again is made whether or not data has been received.

If the timer has expired in step 116, the process proceeds to step 120. In step 120, the eNB sends a message to the UE. Such messages could include, but are not limited to, a simple request for a channel quality indicator (CQI) update or a transmission adjustment update (TA) or both.

In one embodiment, an optional information element is also inserted into the message sent in step 120 to request that the UE provide a report on its DRX status.

The process then proceeds to step 122 in which a check is made to see whether or not a response has been received to the request from step 120.

If a response is received in step 122, the process proceeds to step 126 in which a DRX period is confirmed. Step 126 could be based on DRX information received from the UE in response to an information element (IE) request included in the message in step 120.

From step 126, the proceeds back to step 112 in which the timer is set.

If, in step 122, no response is received, the process proceeds to step 130. In step 130 it is determined that the eNB and the UE are desynchronized with respect to DRX periods. Once the desynchronization is detected in step 130, the eNB can proceed to desynchronization recovery (not shown). Such desynchronization recovery could include various techniques, including those described herein or those described in U.S. patent application Ser. No. 11/674,689.

Figure 2:
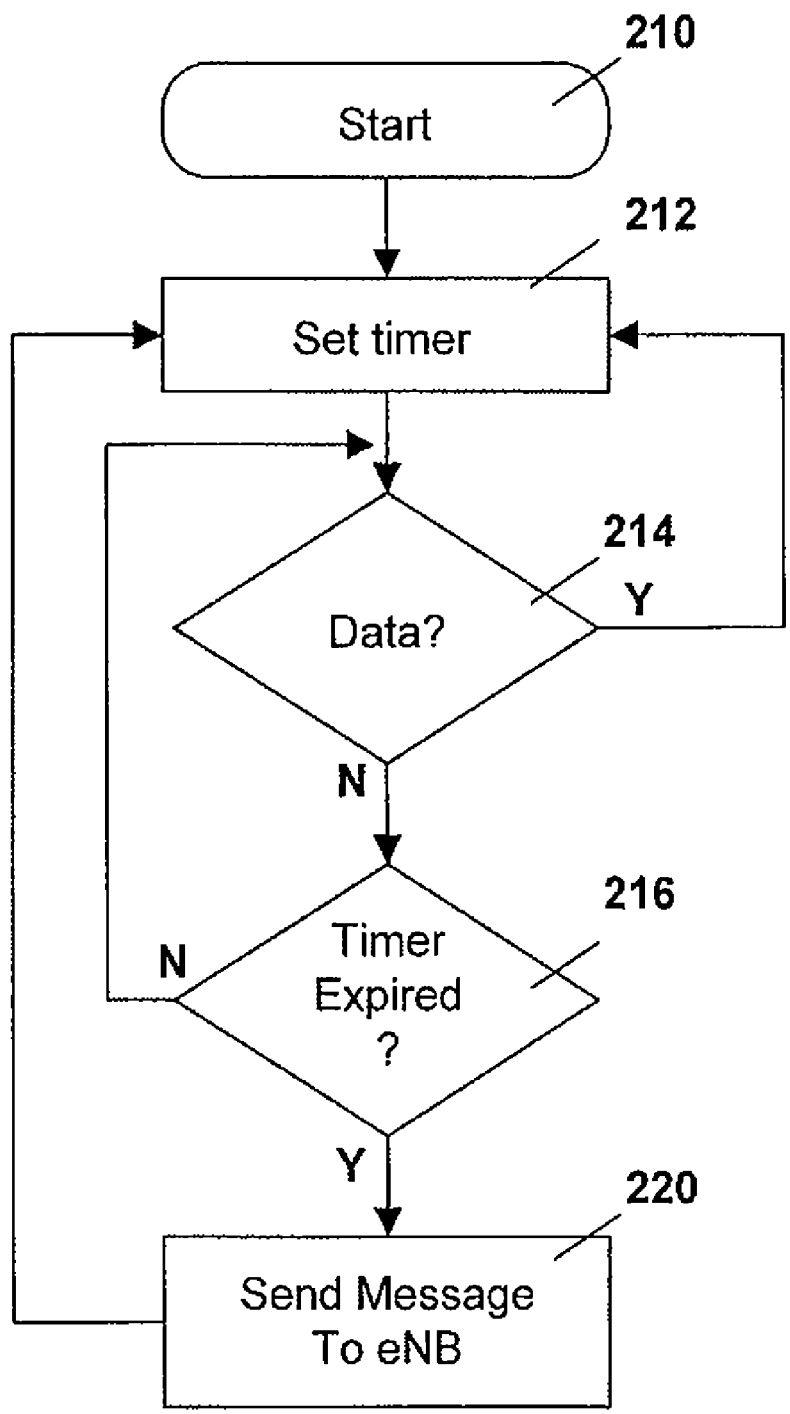
FIG. 2 is a flow diagram illustrating a method for detecting desynchronization through a timer-based solution on a UE.

A similar technique could be utilized on user equipment. Reference is now made to FIG. 2.

In FIG. 2, the process starts at step 210 and proceeds to step 212 in which a timer is set.

The process then proceeds to step 214 in which the process checks whether or not the UE has received data. If yes, the process resets the timer by proceeding back to step 212.

If data has not been received in step 214, the process proceeds to step 216 in which a check is made to see whether the timer has expired. If no, the process proceeds back to step 214 and the check is made whether or not the UE has received data.

If, in step 216, the process detects that the timer has expired, the process proceeds to step 220 in which a message is sent from the UE to the eNB. The message in step 220 could, for example, be a CQI report and/or a TA update to the eNB. An optional field could be inserted into the message to provide the eNB with the DRX period that the UE is currently in.

The process then proceeds back to step 212 in which the timer is set and the process begins again.

As will be appreciated by those skilled in the art, the eNB could detect desynchronization of the DRX period if it receives a message from the UE when it is not expecting such a message or if the message sent in step 220 includes a DRX period that is different from the DRX period the eNB currently has configured for the particular UE.

As will further be appreciated by those skilled in the art, the methods of FIGS. 1 and FIGS. 2 can be combined. Thus, the timers from step 112 in FIG. 1 and 212 in FIG. 2 could be set on the eNB and the UE respectively. The value of the timers, in one embodiment, are preconfigured but do not necessarily match other.

In this case, the desynchronization detection could occur whenever the first of the timers from steps 112 or 212 from FIGS. 1 and 2 respectively expires.

In an alternative embodiment, step 120 of FIG. 1 could send a message that includes the currently used DRX period at the eNB. In this case, even if the DRX period is desynchronized, the response received in step 122 could be utilized in step 126 to show desynchronization. For example, the UE could receive the DRX period of the eNB and compare it to its own DRX period that is currently being used. If the two do not match, a "desynchronization detected flag" could be sent in the response that is received at step 122 by the eNB.

In the embodiment above, desynchronization can therefore be detected by either no response being sent by the UE and thus no response being received in step 122. In this case, the process proceeds to step 130 in which desynchronization is detected. Alternatively, the response received at step 122 and confirmed at step 126 could also include a "desynchronization detected flag" to indicate that synchronization recovery is required.

A situation where the desynchronization detected flag could be sent could, for example, be where the eNB has a longer DRX cycle configured than the UE. In practice, DRX cycles are often multiples of each other and thus if the eNB has a longer cycle, it would likely be a multiple of the shorter cycle at the UE. Thus, the UE will receive the message that is sent in step 120 but will detect desynchronization due to the information contained within the message.

Similarly, referring again to FIG. 2, the message sent in step 220 could include the currently configured DRX period of the UE. The eNB will receive this message and can compare it. The eNB could then utilize the DRX information from the message sent in step 220 in order to communicate a desynchronization detected flag to the UE and then proceed with DRX desynchronization recovery.

Using the above timer based solution, other combinations of messages indicating a DRX period could also be utilized.

Periodic Messaging

In a further embodiment, desynchronization could be detected through the use of a simple heartbeat. In particular, a message could be sent periodically from the eNB to the UE. The periodic message could be configured by the network and sent from the eNB. The UE, upon receipt of the message, could respond in many ways. In one embodiment, it could send the eNB its current DRX period.

The above is illustrated with reference to FIGS. 3 and 4.

Figure 3:
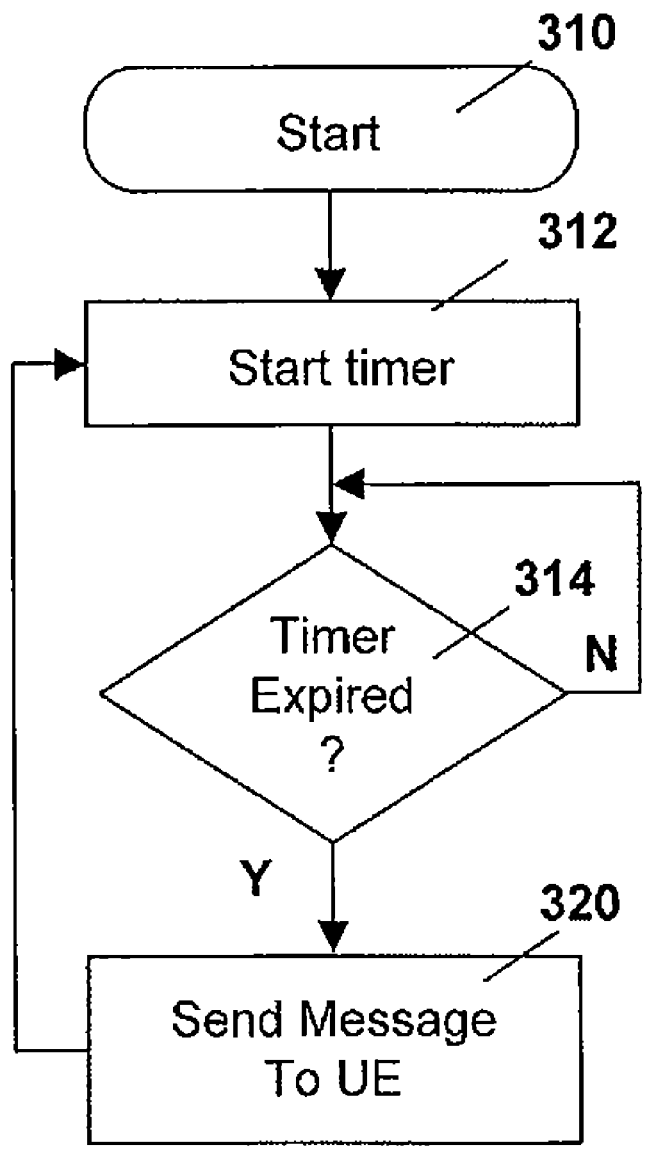
FIG. 3 is a flow diagram illustrating a method for detecting desynchronization through a heartbeat on an eNB.

Referring to FIG. 3, the figure illustrates the process from the eNB perspective. The process starts at step 310 and proceeds to step 312 in which the timer is started. As indicated above, the timer value is set by the network and is known to both the eNB and the UE.

The process then proceeds to step 314 in which a check is made to see whether or not the timer has expired.

If the timer has not expired, the process proceeds back to step 314 and continues to check until the timer does expire.

The process then proceeds to step 320 in which a message is sent to the UE. In one embodiment, the message includes information about the current DRX period on the eNB or could include an information element asking for DRX information from the UE.

Figure 4:
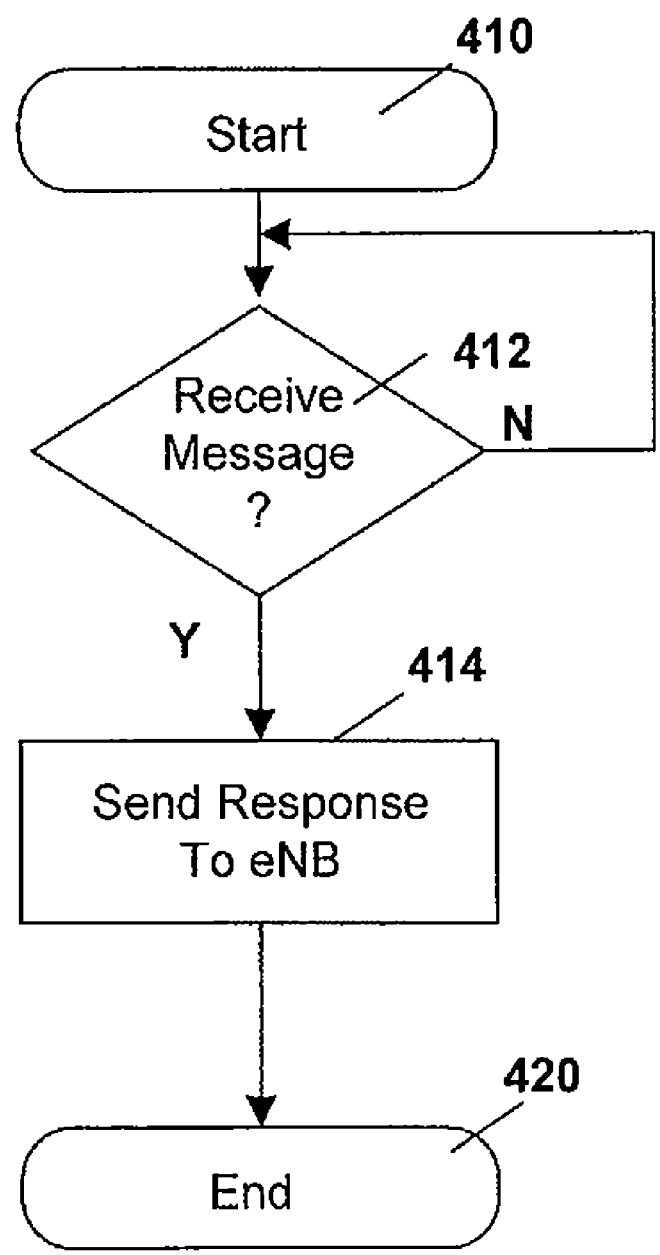
FIG. 4 is a flow diagram illustrating a method for detecting desynchronization through a heartbeat on a UE.

Referring to FIG. 4, the process from the UE perspective starts at step 410. As will be appreciated by those skilled in the art, the UE knows the timer value and thus can ensure that it is awake during the expiration of the timer. Specifically, the UE could configure itself based on network signaling to be awake at a specific period of time to ensure that it receives the heartbeat message sent by the eNB at step 320 in FIG. 3.

From step 410, the process proceeds to step 412 in which it checks to see whether it has received the message. If no, the process continues to wait until it receives a message at step 412.

If yes, the process proceeds to step 414 in which a response is sent. In one embodiment, the response sent in step 414 includes the current DRX period of the UE. Alternatively, if the eNB provided the DRX period at the eNB, the UE could make a check to see whether there is desynchronization, and if yes, send a "desynchronization detected flag".

The process then proceeds to step 420 and ends.

As will be appreciated from FIG. 4, the process is only awake for a brief period of time for the heartbeat messaging.

Piggybacking on Periodic Messages

In a further embodiment, a DRX period could be added to current periodic messages sent between the UE and the eNB.

Specifically, proposals in 3GPP RAN include periodic reporting of the channel quality indicator (CQI) and/or periodic transmission adjustment updates. The DRX information that is currently implemented on the UE could be added to these messages.

As will be appreciated, the addition of DRX information to periodic messages adds very little overhead. All handshaking between the UE and the eNB have been performed already and the reports could merely be a few bytes added to the periodic message to indicate the DRX period.

As will be further appreciated, the information could be conveyed in a variety of forms. Specifically, the report could indicate a value between DRX awake periods. Alternatively, if there are a predetermined number of DRX states they could indicate a value to show which DRX state the UE is currently in. Other alternatives would be known to those skilled in the art having regard to the present disclosure.

Figure 5:
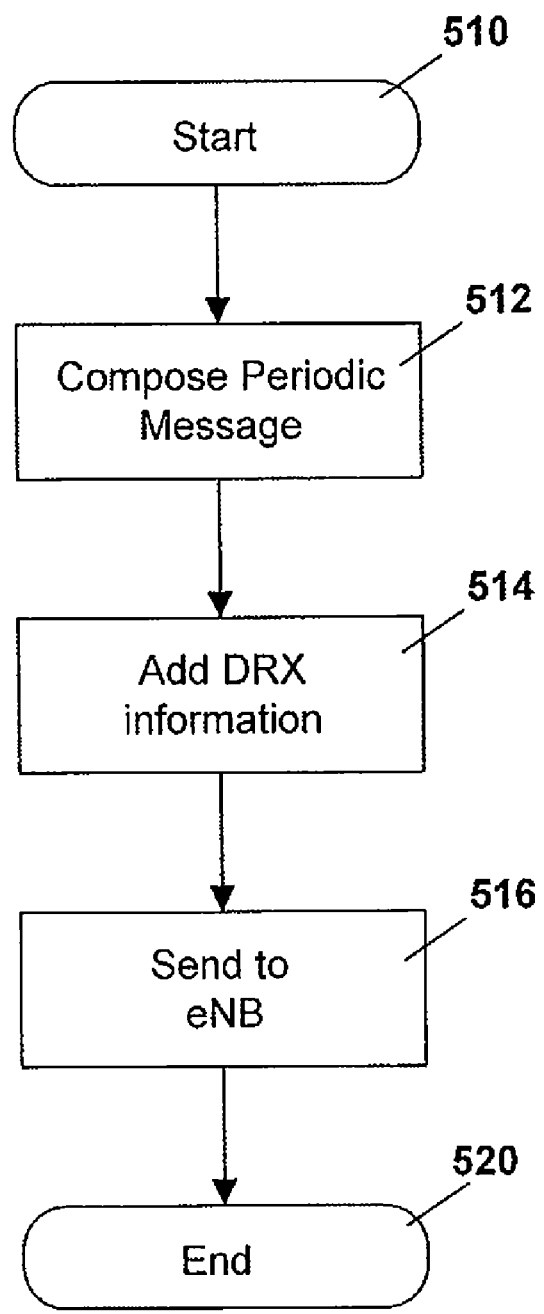
FIG. 5 is a flow diagram illustrating a method for piggybacking DRX period information on to existing periodic messages.

Referring to FIG. 5, the process starts at step 510 and proceeds to step 512 in which a periodic message is composed. For example, if it is a CQI message being sent, the UE could measure the channel quality and compose the message to be sent back to the eNB.

The process then proceeds to step 514 in which DRX information for the UE is added to the periodic message.

The process then proceeds to step 516 in which the message with the DRX information added to it is sent to the eNB.

The process then ends at step 520.

Overcoming Miscommunication of Explicit Messages

In a further embodiment, synchronization loss may be triggered by a miscommunication of an explicit message that the eNB sends to the UE to communicate a change in the DRX cycle and when the two should change. In either case, the eNB knows both the previous DRX period, hereinafter referred to as DRX_OLD, and a new DRX period, hereinafter referred to as DRX_NEW.

If the UE and eNB are desynchronized in terms of DRX, when data arrives at the UE during DRX, the UE typically goes into a continuous reception mode immediately, accesses a random access channel, obtains uplink resources and transmits the data to the eNB. Uplink data transmission can therefore resolve DRX desynchronization.

However, for downlink data, the data is transmitted by the eNB at the time that it believes the UE is awake from DRX. If there is no response from the UE after a certain number of retransmissions, the eNB considers that the UE is desynchronized in DRX and mechanisms to overcome it, such as those described in U.S. patent application Ser. No. 11/674,689, the contents of which are incorporated herein by reference, can be utilized.

Figure 6:
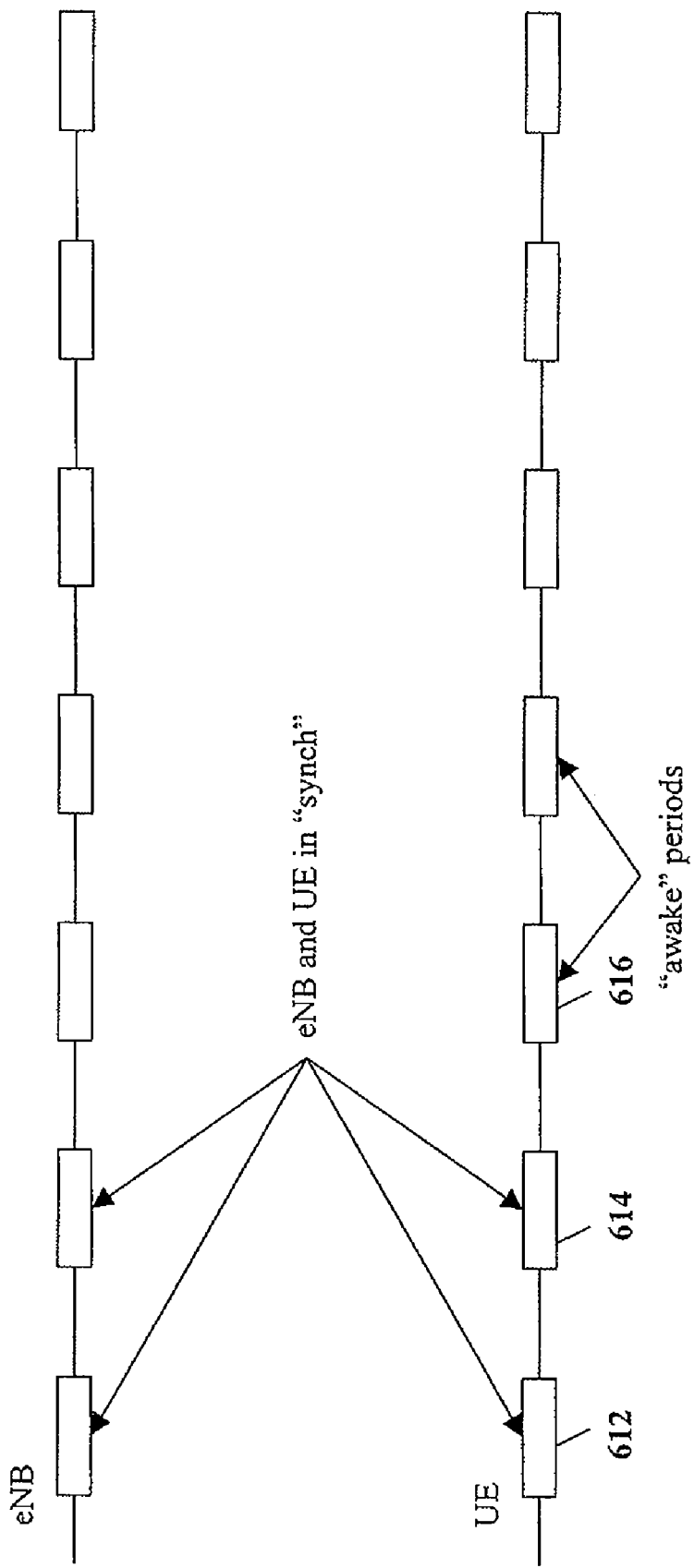
FIG. 6 is a timing diagram showing DRX awake periods when the UE and eNB are synchronized.

Reference is now made to FIG. 6. FIG. 6 displays a situation when the eNB and the UE are synchronized with respect to the DRX. In this case, the DRX period has not changed and the UE knows when awake periods 612, 614, 616, etc. are.

Figure 7:
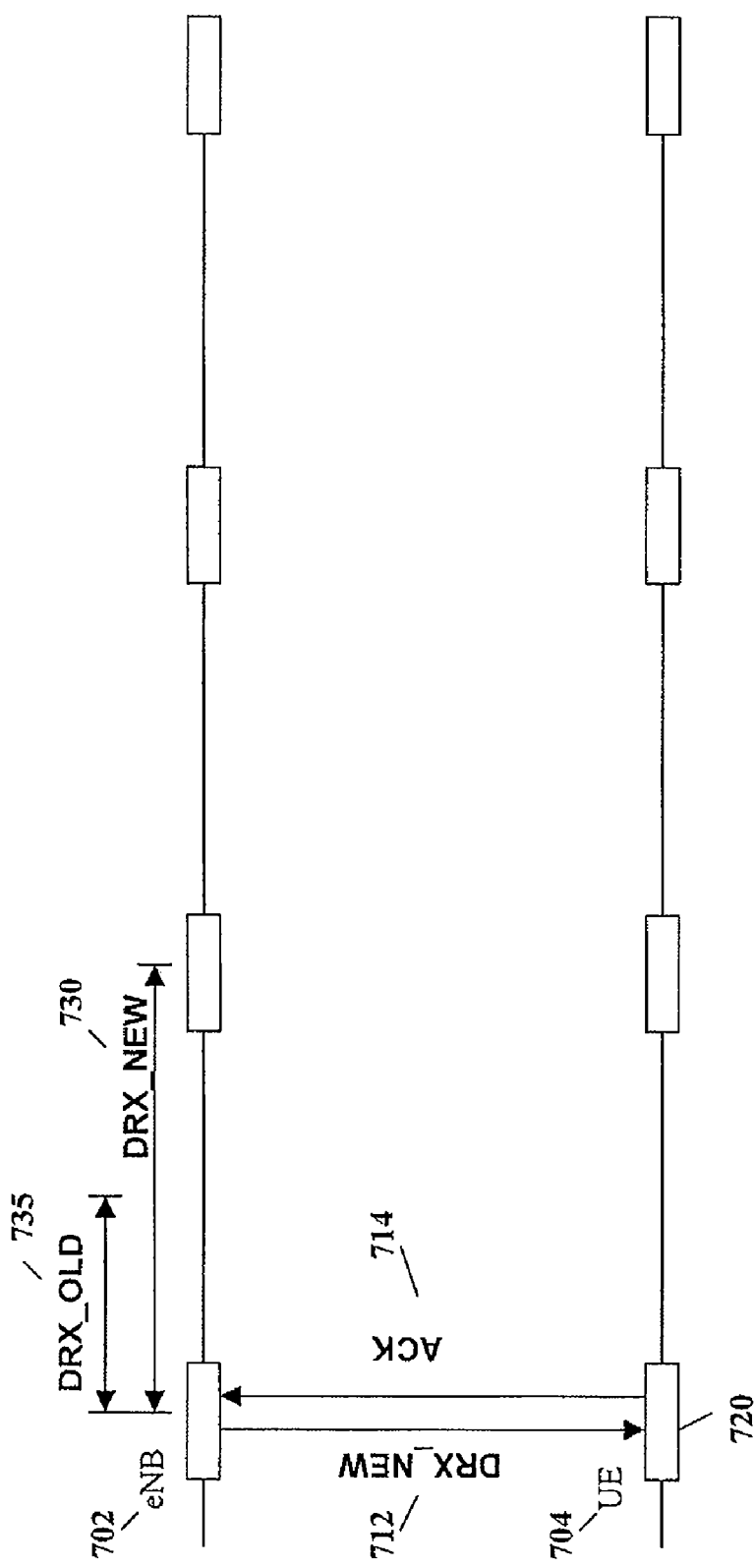
FIG. 7 is a timing diagram showing a successful transition from a DRX_OLD to a DRX_NEW period.

When a DRX period is to be changed, FIG. 7 illustrates a successful DRX period change. In this case, a message 712 is sent between eNB 702 and UE 704. The message is sent during awake period 720. Message 712 is acknowledged in message 714.

Subsequently both the eNB and UE adopt the DRX NEW period 730 and ignore DRX_OLD period 735. As will be appreciated, eNB and UE continue to communicate successfully since the DRX periods are synchronized.

Figure 8:
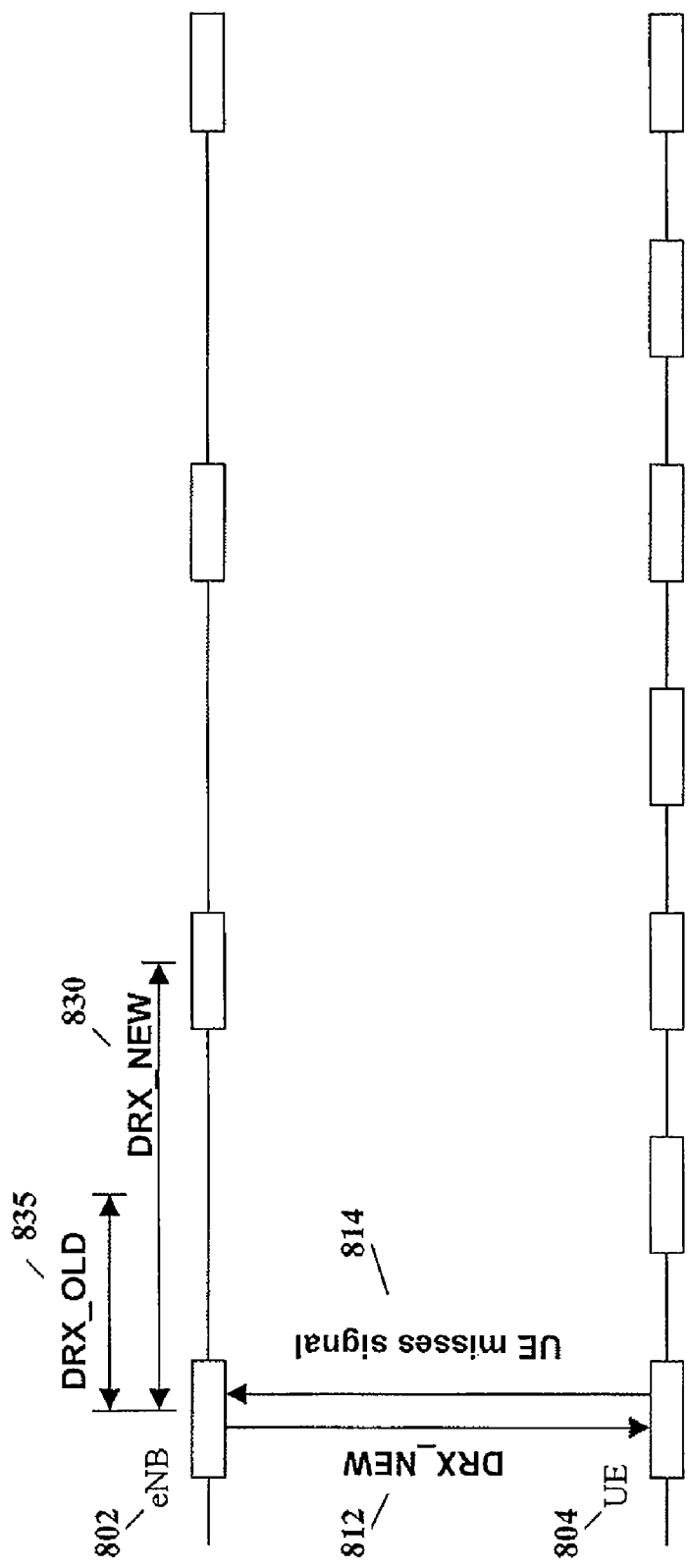
FIG. 8 is a timing diagram showing an unsuccessful transition from a DRX_OLD to a DRX_NEW period.

Referring to FIG. 8, a communication 812 is sent by the eNB to change the DRX period to a new DRX period 830 from old DRX period 835. A response 814 is somehow misinterpreted by the eNB 802 from the UE 804 and thus the eNB 802 thinks that the UE has successfully transitioned to the new longer DRX period 830 while UE 804 thinks that it is still in the old shorter DRX period 835.

In order to detect the desynchronization as illustrated in FIG. 8, the eNB, in one embodiment, will send a message to the UE at a multiple of the shorter of the old or new DRX time. Many types of messages can be sent, but again an optional information element is preferably inserted into the message to request the UE to report its DRX status and one message response from the UE must contain the UE DRX period. This is where the desynchronization detection can be made.

Figure 9:
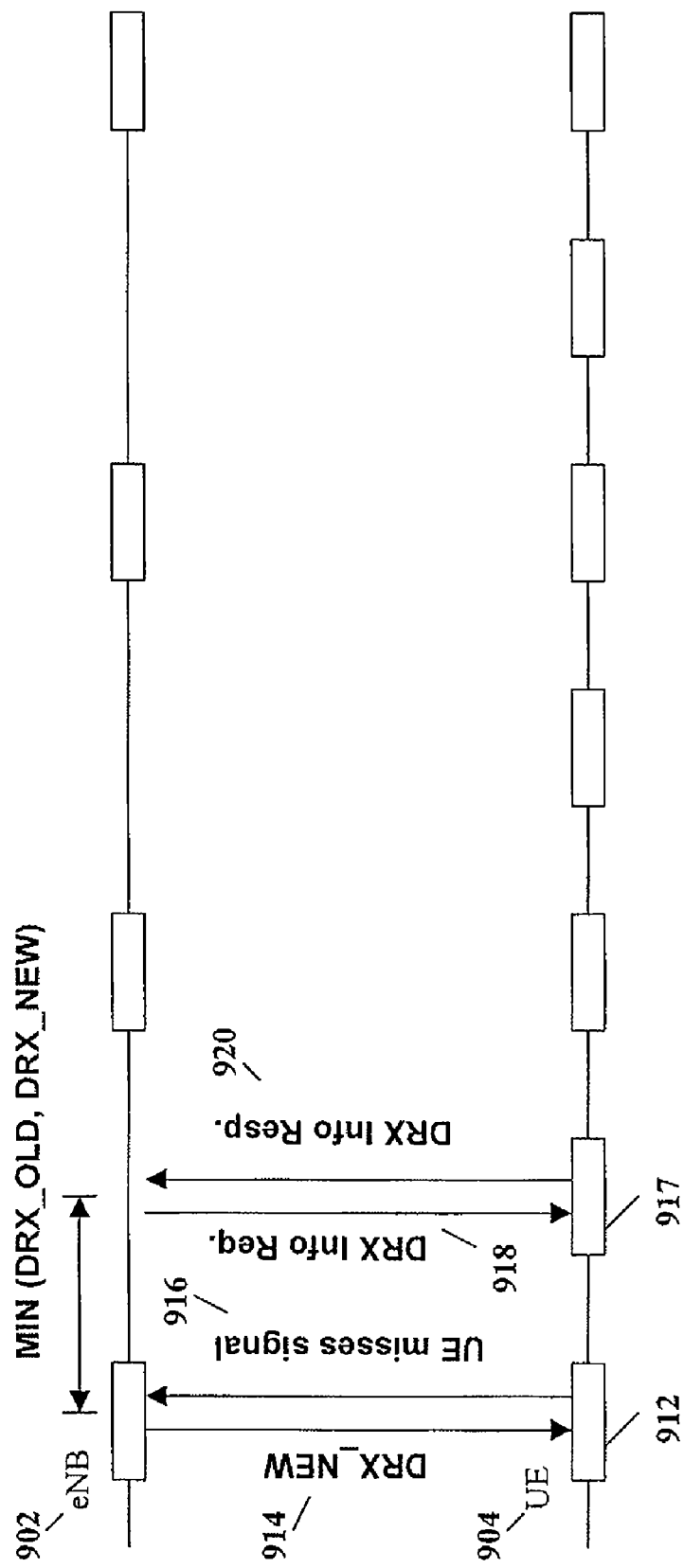
FIG. 9 is a timing diagram illustrating a method for DRX desynchronization detection after a transition attempt.

The above is illustrated in FIG. 9.

In FIG. 9, an eNB 902 communicates with a UE 904. In time interval 912 UE is awake and the eNB 902 sends a new DRX message 914 to the UE. UE somehow misses this message as illustrated by arrow 916.

The eNB 902 then, at the minimum of the old DRX and the new DRX, illustrated by timeslot 917, sends a DRX information request 918 and the UE sends a message 920 back to the eNB. As will be appreciated by those skilled in the art, the eNB will then realize that the UE and the eNB have desynchronized DRX periods.

Alternatively, message 918 includes the currently used DRX information at the eNB. The UE can then check the received DRX from the eNB with its currently used DRX. If the two match, the DRX is synchronized, otherwise, desynchronization is detected.

The impact of the two unsynchronized use cases above are different. In the case of the DRX_NEW being greater than DRX_OLD, the UE will waste battery life for one DRX cycle. In the case of DRX_NEW being smaller than DRX_OLD, the UE may miss data from the eNB. In this case, the eNB should send the DRX probe at the beginning of the new DRX awake period to avoid useless packet transmissions since the UE may still be in sleep mode.

Figure 10:
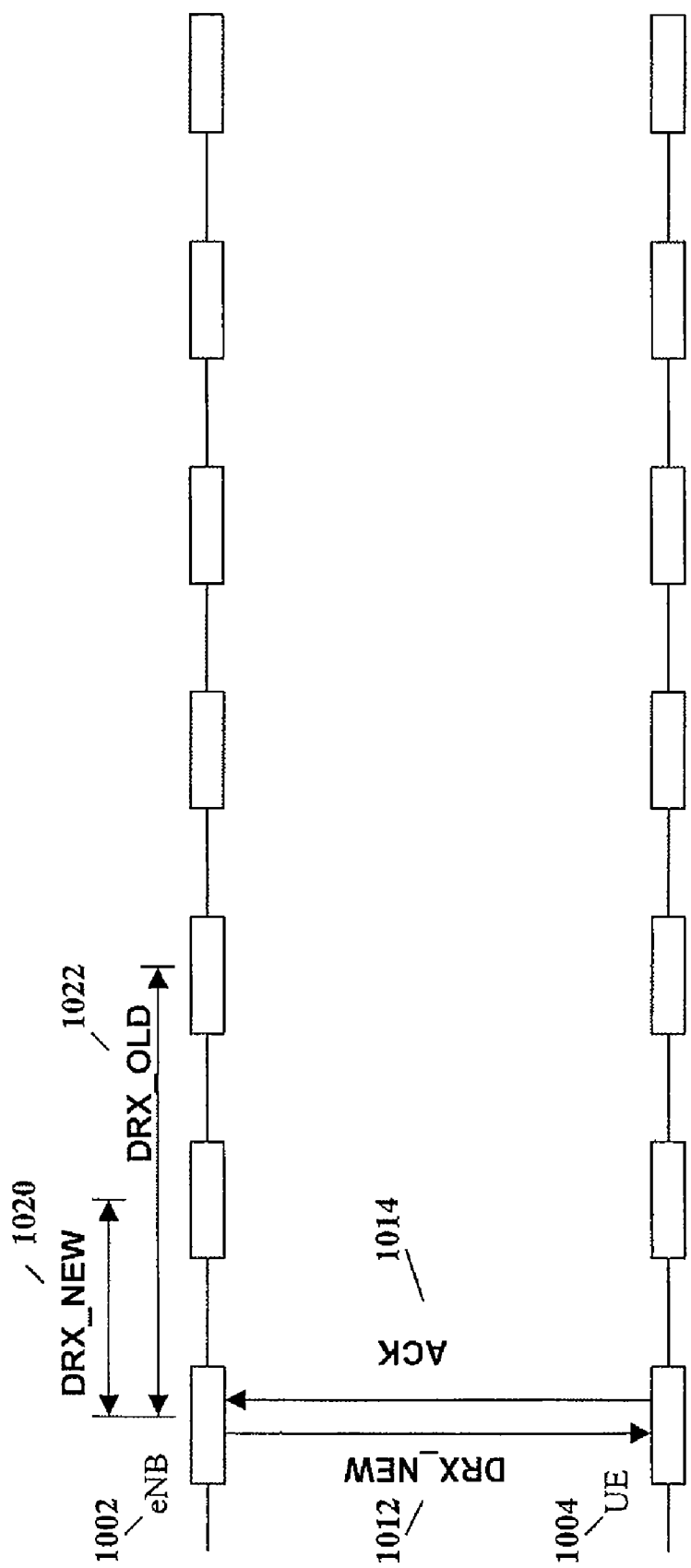
FIG. 10 is a timing diagram illustrating a successful transition from a long DRX_OLD period to a shorter DRX_NEW period.

Reference is now made to FIG. 10. In FIG. 10, the situation is illustrated that the UE and eNB move to a shorter DRX cycle. In this case, the eNB 1002 communicates with UE 1004 and indicates a new DRX period in message 1012. The UE acknowledges this in message 1014.

As illustrated, a DRX_NEW period 1020 is shorter than DRX_OLD period 1022. However, in the example of FIG. 10, the transition is successful and the eNB and UE remain synchronized.

Figure 11:
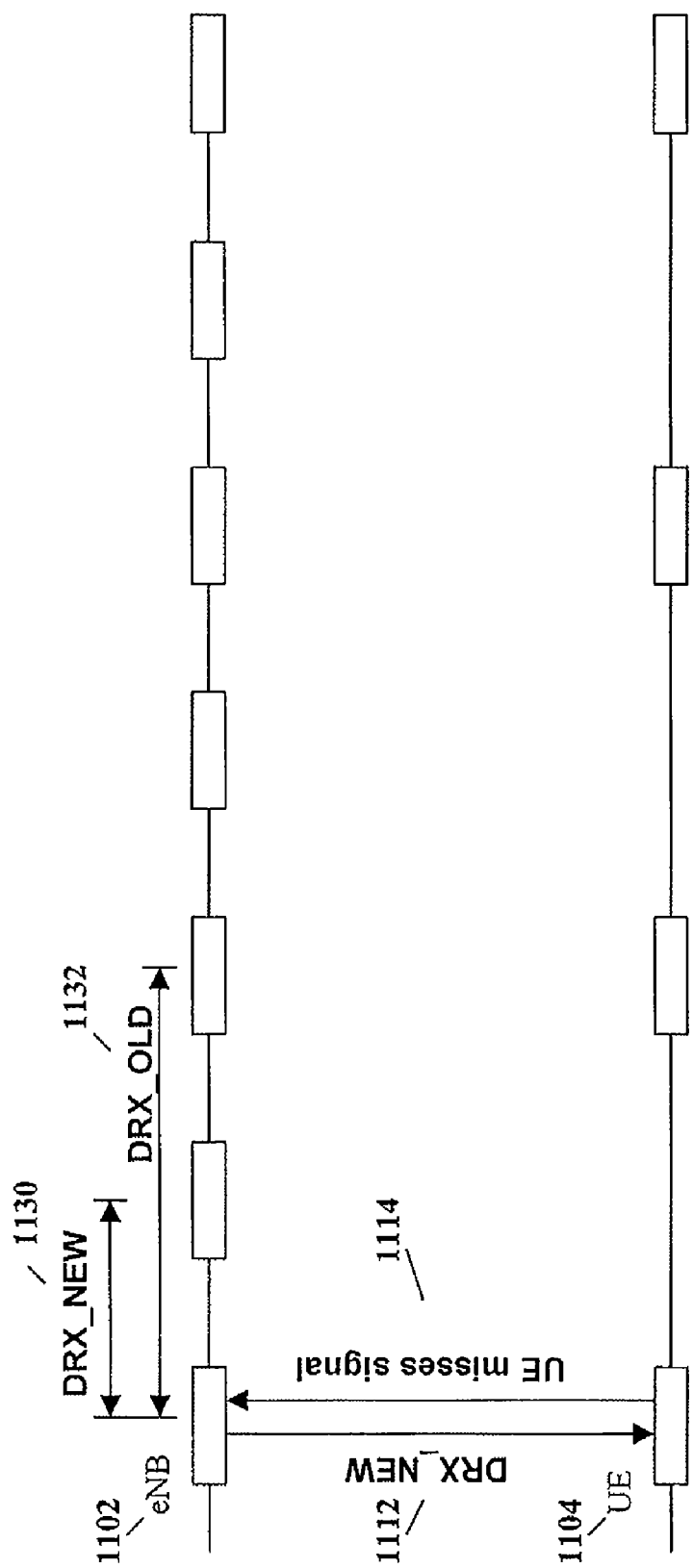
FIG. 11 is a timing diagram illustrating an unsuccessful transition from a long DRX_OLD period to a shorter DRX_NEW period.

Referring to FIG. 11, the eNB 1102 communicates with UE 1104 and sends a DRX_NEW message 1112 indicating a shorter DRX_NEW period 1130. The UE misses this and remains in the longer DRX_OLD period 1132.

The above indicates that the eNB 1102 and UE 1104 will become desynchronized with respect to the DRX.

Figure 12:
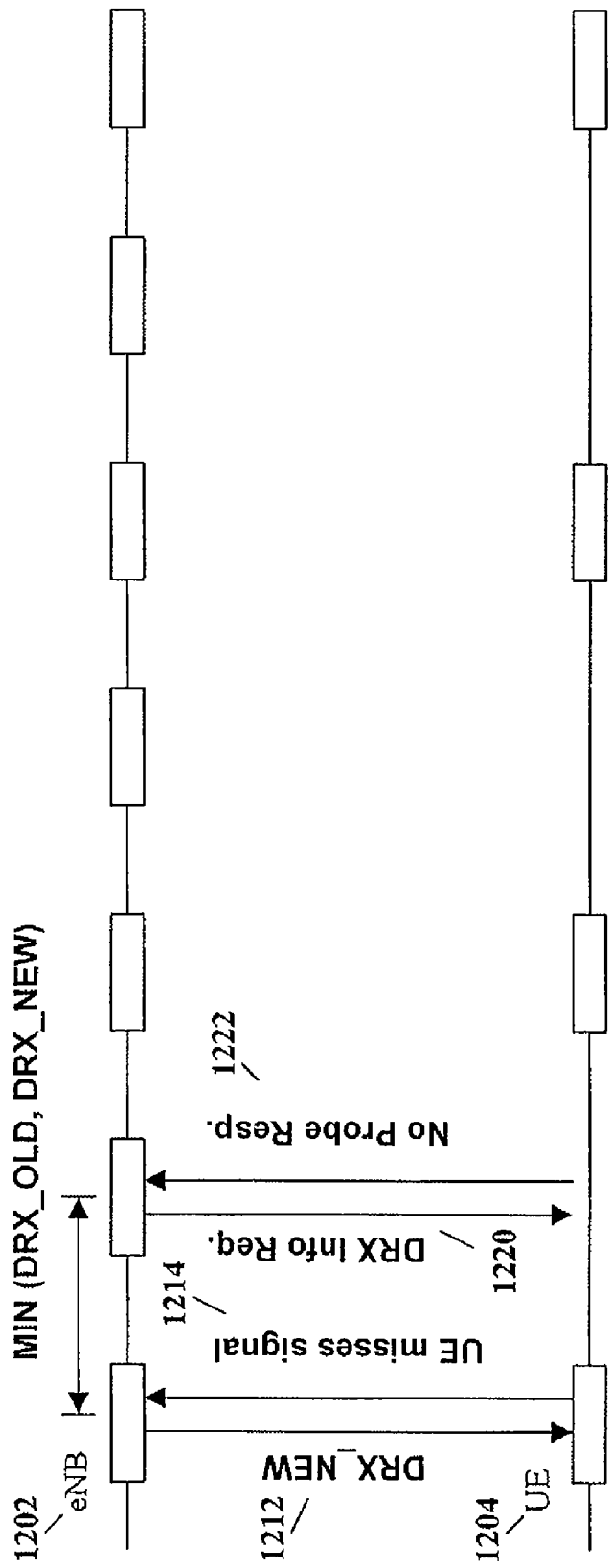
FIG. 12 is a timing diagram illustrating a method for a DRX desynchronization detection upon transitioning from a longer DRX_OLD period to a shorter DRX_NEW period.

Reference is now made to FIG. 12. In this case, eNB 1202 communicates with UE 1204 and wants to transition to a shorter DRX period. The configuration is sent in message 1212. The UE misses the instructions from message 1212 and remains in a longer DRX period, as illustrated by arrow 1214.

In the embodiment of FIG. 12, the eNB 1202 sends a further message 1220 in the shorter of the DRX_OLD and the DRX_NEW periods.

As will be appreciated by those skilled in the art, since the UE 1204 is in DRX during the communication of message 1220, it will miss this communication. Thus no probe response is returned, as illustrated by arrow 1222. The eNB may detect the desynchronization based on the lack of response from the UE to communication 1220.

Figure 13:
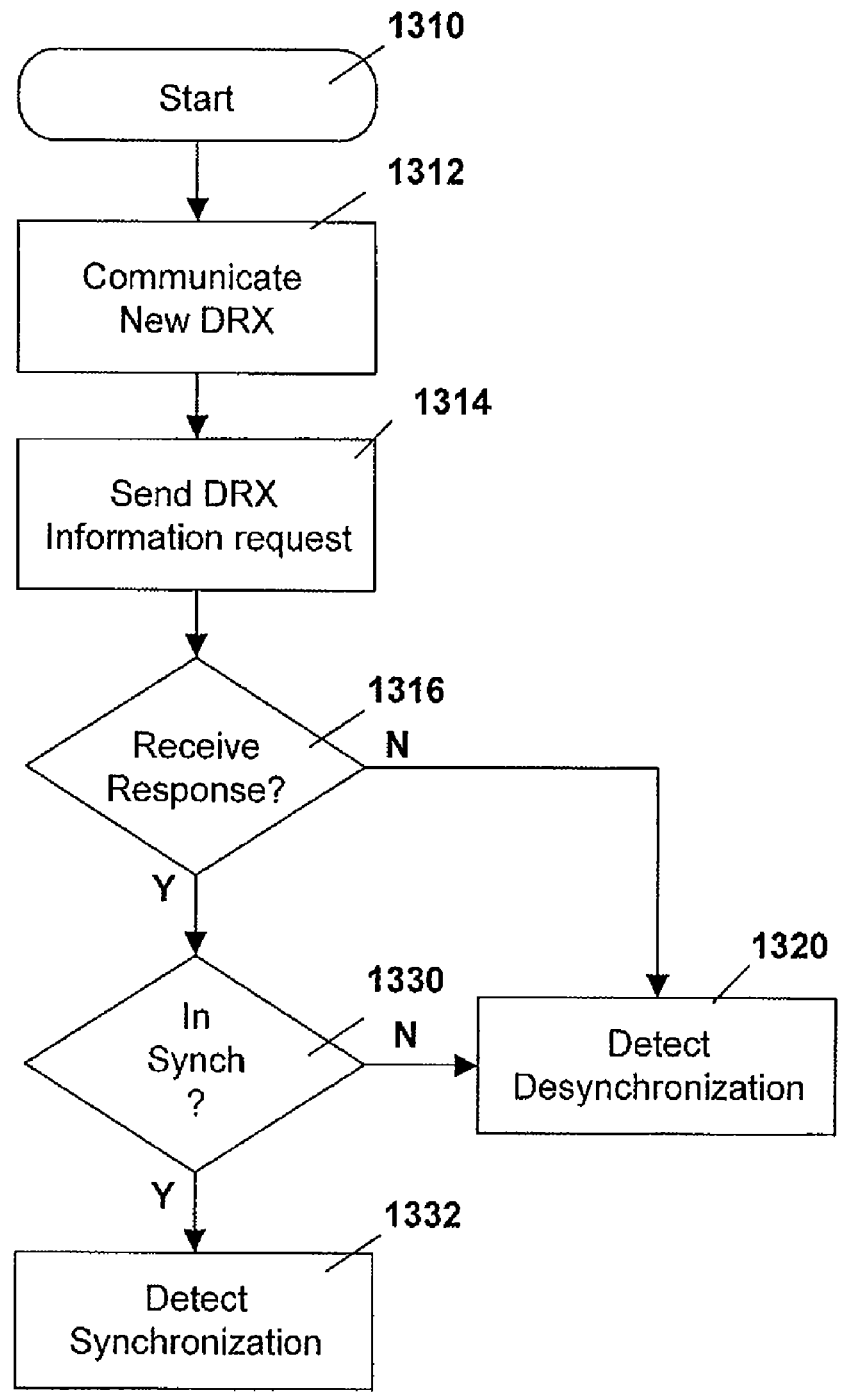
FIG. 13 is a flow diagram illustrating a method for DRX desynchronization detection.

The above can be seen with reference to FIG. 13 which shows a flow diagram of a process for the eNB to overcome miscommunication. Specifically, the process starts at 1310 and proceeds to step 1312 in which a DRX_NEW period is communicated to the UE.

The process then proceeds to step 1314 in which a DRX information request message is sent at the shorter of the DRX_OLD or the DRX_NEW.

The process then proceeds to step 1316 in which it checks to see whether or not a response has been received from the UE. If no, the process proceeds to step 1320 in which desynchronization is detected.

Conversely, if a response is received at step 1316, the process proceeds to step 1330 in which the message response is checked to see whether or not the eNB and UE are synchronized with respect to the DRX periods. As will be appreciated, the information response received by the eNB could either contain information about the UE's DRX period or could indicate a DRX desynchronization flag if the UE performs a check to see whether or not the DRX period is synchronized.

From step 1330 if the process detects that the eNB and the UE are desynchronized with respect to the DRX period, the process proceeds to step 1320 in which desynchronization detection is noted.

Conversely, the process from step 1330, if synchronization is verified, proceeds to step 1332 in which synchronization is confirmed.

Recovery

In the above, a message is sent to the UE by the eNB soon after both go into a new DRX cycle. As an extension, a time can be established after the sending of a message to detect DRX desynchronization, where the eNB executes a recovery procedure.

In a first embodiment, desynchronization may occur when the UE sends a NACK in response to a downlink transmission but the eNB erroneously interprets it as an ACK or if the UE misses the transmission and the eNB erroneously interprets the DTX as ACK. To recover, the eNB uses the DRX_OLD to determine a future wake-up time and instruct the UE to go back to the continuous reception mode.

More specifically, the eNB stores the most recent time that the new DRX reconfiguration message was acknowledged by the UE. This time will be referred to herein as $T_{last}$. This may be the last time that a successful transmission to the UE occurred. On detection of DRX desynchronization, the eNB transmits a continuous reception command to the UE at the time that is defined by the equation:

$$T_{cont} = T_{last} + DRX\_OLD \times N \quad (1)$$

Where N is an integer that is chosen so that $T_{cont}$ will occur after the current time.

As will be appreciated by those skilled in the art, the above is used when the eNB realizes that the UE has not transitioned from the DRX_OLD to the DRX_NEW sleep period and thus the UE can be reached at a multiple of the DRX_OLD.

Figure 14:
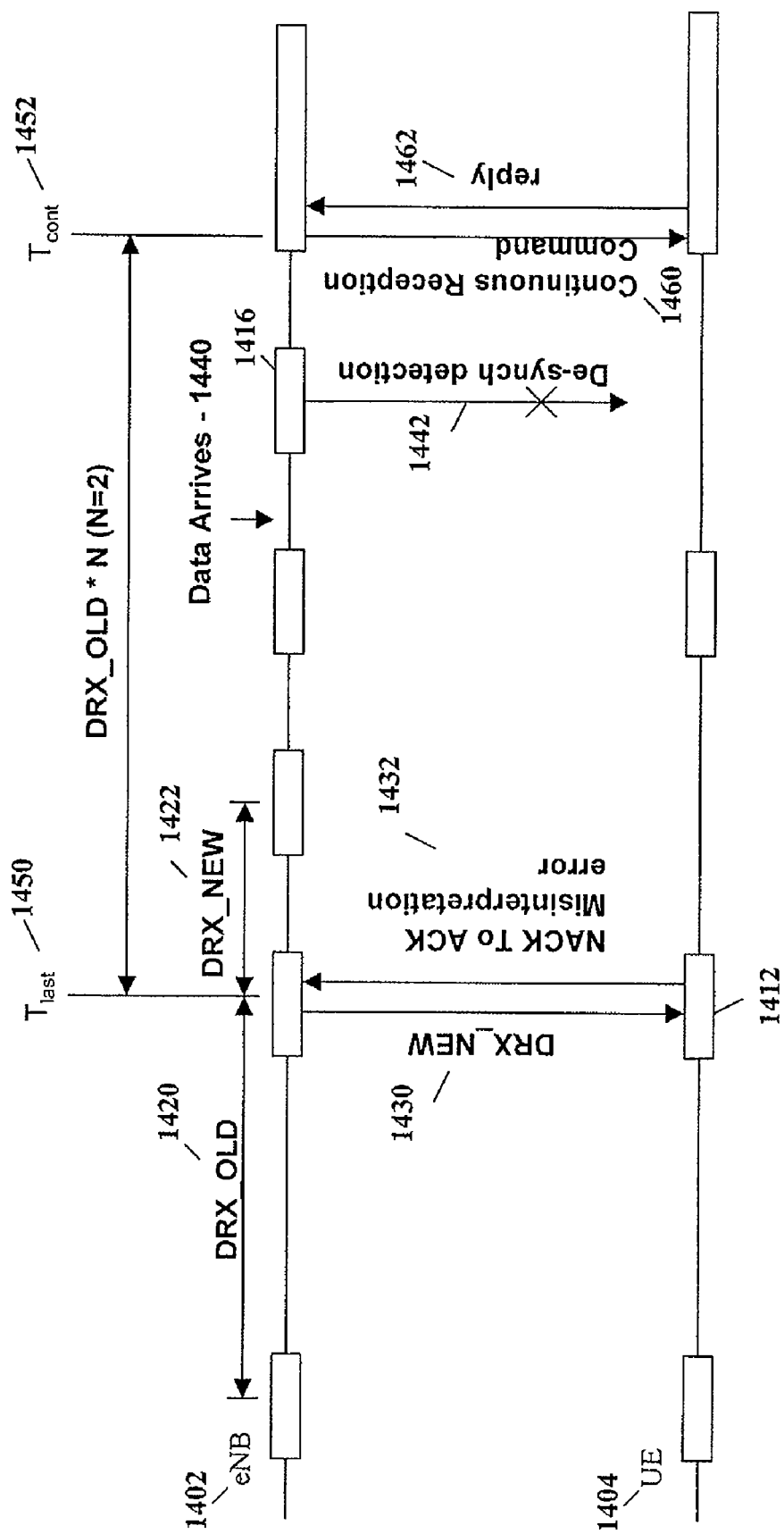
FIG. 14 is a timing diagram illustrating a recovery method for DRX desynchronization caused by misinterpretation of explicit DRX period change messaging.

Reference is now made to FIG. 14. An eNB 1402 communicates with a UE 1404 and at time period 1412, the UE DRX awake period corresponds with the eNB knowledge of the UE DRX awake period.

A DRX_OLD time period 1420 is configured.

At awake time 1412, eNB communicates a new DRX 1422 in message 1430 to UE 1404. In response, the UE sends a NACK, which is interpreted based on a NACK to ACK error at eNB 1402.

The eNB then, after a data arrival 1440, sends a communication in time interval 1416 that it expects the UE 1404 to be awake. This is sent in message 1442.

As a result of not receiving a response to message 1442 and possibly a few retransmissions, the eNB realizes that the eNB and the UE are desynchronized. As will be appreciated, the fact that the eNB does not receive a response to data message is an indicator of desynchronization, and could be a means for detecting desynchronization.

Using formula (1) indicated above, the eNB knows that the Tiast 1450 occurred when the eNB sent message 1430 and receiving a response 1432 back. This was the last successful communication with the UE.

The eNB then calculates a time $T_{cont}$ based on $T_{last}$+DRX_OLD period times N. In the case illustrated in FIG. 14, N=2. The eNB could then send a continuous communication command 1460 at $T_{cont}$ 1452 after which the UE 1404 moves into a continuous reception mode. UE will further send a reply 1462.

Recovery from Implicit UE Behavior

In a further embodiment, the eNB configures a rule for implicit UE behavior such as applying a longer DRX value after a certain duration of data inactivity.

Figure 15:
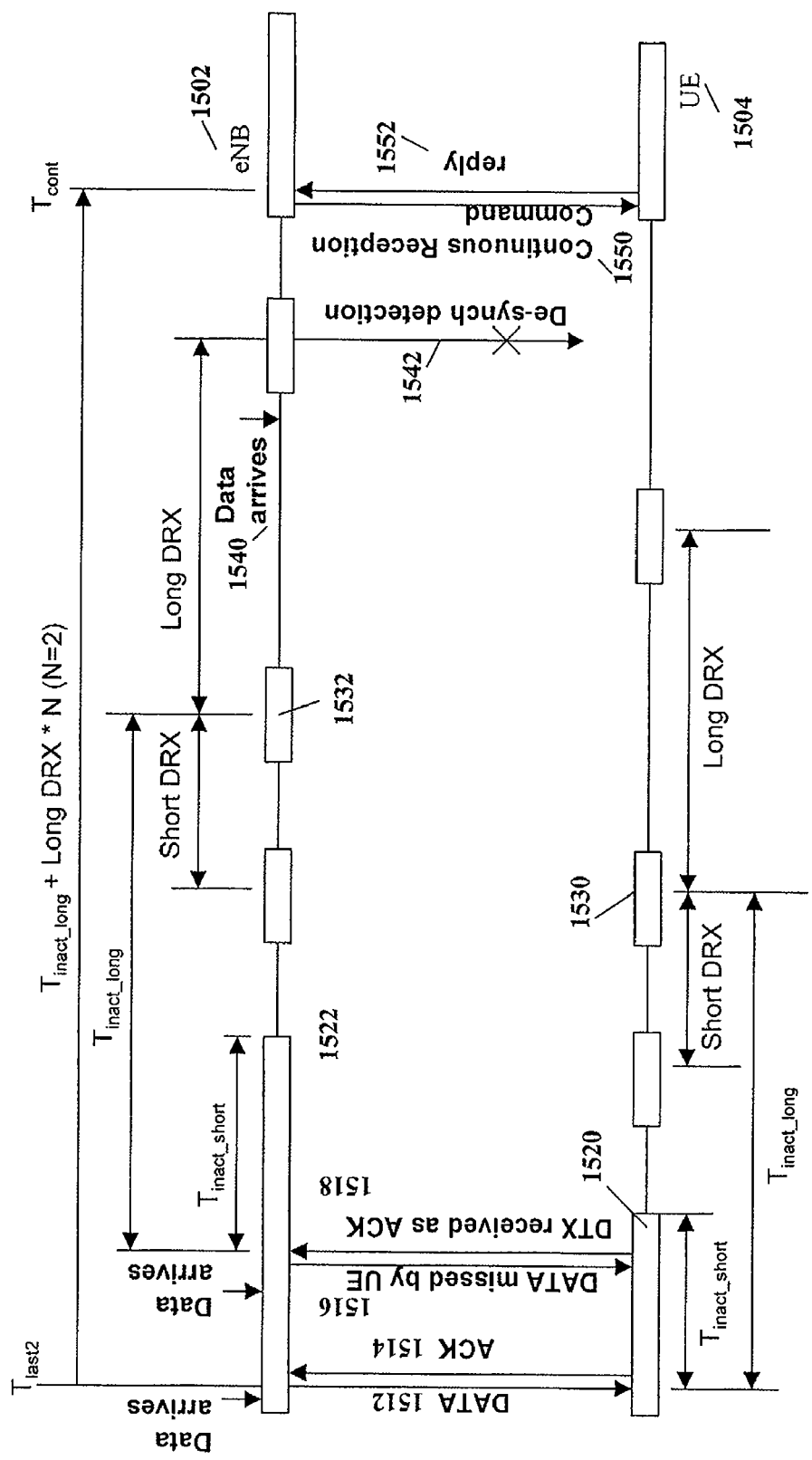
FIG. 15 is a timing diagram illustrating a recovery method for DRX desynchronization caused by implicit DRX period changes.

Reference is now made to FIG. 15. In FIG. 15, the term $T_{inact\_short}$ is used to indicate a first time within which the UE is expected to proceed to a short DRX period if no data activity has occurred for that period of time. Further, $T_{inact\_long}$ is used to denote a longer DRX cycle that is activated when no data has occurred a longer time period. It is also assumed that when new data is received, the UE goes back into continuous reception mode.

Desynchronization may occur when the UE misses the downlink data indication when the eNB erroneously interprets a DTX from the UE as an ACK.

Referring to FIG. 15, an eNB 1502 communicates with UE 1504.

Data is sent in message 1512 and responded to in message 1514.

In message 1516, data is sent to the UE 1504. This data is missed by the UE and the eNB interprets the DTX as an ACK in message 1518.

As will be appreciated by those skilled in the art, the eNB considers that data was sent in message 1516 and was acknowledged in message 1518 while the UE does not have this data and therefore the $T_{inact\_short}$ time starts running at the UE 1504 from the time that message 1512 was received.

The UE 1504 then moves into a DRX cycle at time 1520, whereas the eNB thinks that the DRX cycle starts after a time $T_{inact\_short}$ from the time that message 1518 was received, or a time 1522. This results in the eNB 1502 and the UE 1504 being desynchronized.

Further, after a $T_{inact\_long}$ the UE 1502 moves into a long DRX cycle at time 1530 while the eNB moves into the long DRX cycle at a time 1532.

Data arrives at time 1540 and is communicated in a message 1542 to the UE 1504. However, since UE 1504 is in a different DRX, then eNB 1502, the UE does not receive message 1542 or its retransmissions. Since the eNB does not receive a reply, the eNB 1502 realizes that the DRX periods have become desynchronized and recovery is started.

In this case, the recovery is based on one of two equations. The eNB assumes that some error was involved in the last communication 1516 and message 1518 and therefore uses as a base time message 1512 and 1514 which are designated as $T_{last2}$. $T_{last2}$ is the time of the second last message that the eNB considers to be successfully sent.

The eNB then uses the equations:

If the present time is larger than $T_{last2}+T_{inact\_long}$, use
$$T_{cont}=T_{last2}+T_{inact\_long}+\text{long } DRX \text{ value}*N \quad (2)$$

Else if present time is larger than $T_{last2}+T_{inact\_short}$,
use $T_{cont}=T_{last2}+T_{inact\_short}+\text{short } DRX \text{ value}*N \quad (3)$ Where N is an integer that is chosen so that $T_{cont}$ will occur after the current time.

Referring again to FIG. 15, in this case, the time is larger than $T_{last2}+T_{inact\_long}$ and therefore the first equation above is used to find when the UE will next be awake. At that point, a continuous reception command 1550 is sent a reply 1552 is sent back from UE 1504 to eNB 1502. The UE and the eNB then both move to continuous reception at which point the data that arrived at time 1540 can be resent to the UE.

As will be appreciated by those skilled in the art, the above estimation assumes that the second most recent successful transmission does not involve any errors. If the last two consecutive transmissions are corrupted by errors, then the estimation above does not work. However, excessive iterations of estimating the UE awake time and sending continuous reception command is in general not desirable and therefore if the UE does not recover from desynchronization utilizing the above formulas, the solution presented in U.S. patent application Ser. No. 11/674,689 may be used instead.

Also, if the preconfigured timing is earlier than the estimated timing, then the eNB should send a continuous reception command to the UE at a preconfigured time. Exchange of the continuous reception command and response between the eNB and the UE are described in U.S. patent application Ser. No. 11/674,689. In this case, L1/L2 signaling or MAC signaling is used for the exchange.

The use of two equations above ensures the correct DRX period is applied for recovery. Thus, equation (2) from above is used when the time elapsed from the second last message is great enough that the UE had entered long DRX. Equation (3) is used when the time elapsed since the second last message is greater than the idle time required to enter short DRX but less than the time required to enter long DRX.

As will further be appreciated, the solution presented with reference to FIG. 15 and equations (2) and (3) above assumes that the UE will only enter two DRX states: Short DRX and Long DRX. If the DRX transition includes more states, the above formulas could be modified by those skilled in the art to include further equations based on the number of DRX states possible. Specifically, if a third "Intermediate DRX" state exists between Short DRX and Long DRX, then the equations could be modified to be:

If the present time is larger than $T_{last2}+T_{inact\_long}$, use
$$T_{cont}=T_{last2}+T_{inact\_long}+\text{long } DRX \text{ value}*N \qquad (4)$$

Else if the present time is larger that $T_{last2}+T_{inact\_intermediate}$, use $T_{cont}=T_{last2}+T_{inact\_intermediate}+\text{intermediate } DRX \text{ value}*N \qquad (5)$ Else if present time is larger than $T_{last2}+T_{inact\_short}$, use $T_{cont}=T_{last2}+T_{inact\_short}+\text{short } DRX \text{ value}*N \qquad (6)$ In the above $T_{inact\_intermediate}$ is used to indicate the time required before transition to the intermediate DRX period and N is again chosen to ensure $T_{cont}$ is greater than the current time.

Using the above, further DRX transition periods could be added in a similar manner. The time period that is used to make the $T_{cont}$ calculation is based on the largest inactive time for a particular DRX period that has currently been exceeded. In particular, if the time from $T_{last2}$ is greater than $T_{inact\_short}$ but shorter than $T_{inact\_intermediate}$, then formula number 4 is used. Similarly, if the time from $T_{last2}$ is greater than both $T_{inact\_short}$ and $T_{inact\_intermediate}$, but less than $T_{inact\_long}$, then formula 5 is used.

The above therefore describes various ways to detect DRX desynchronization and further ways to recover from desynchronization, depending on the cause of the desynchronization.

As will be appreciated, the above can be implemented between an eNB and any UE. One exemplary UE is described below with reference to FIG. 16.

Figure 16:
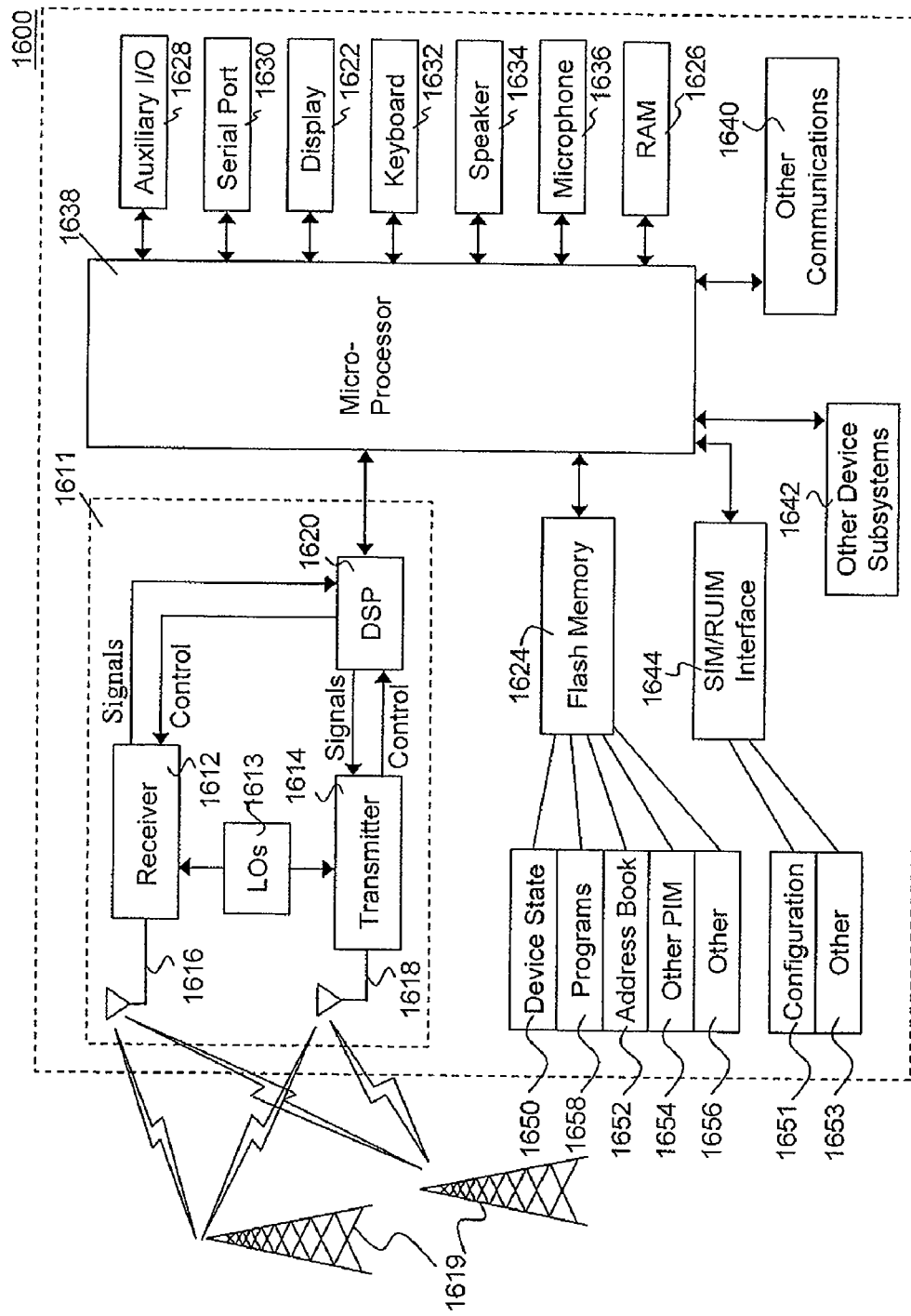
FIG. 16 is a block diagram illustrating an exemplary user equipment adapted to be used with the methods of the present disclosure.

FIG. 16 is a block diagram illustrating user equipment apt to be used with preferred embodiments of the apparatus and method of the present application. User equipment 1600 is preferably a two-way wireless communication device having at least voice and data communication capabilities. User equipment 1600 preferably has the capability to communicate with other computer systems on the Internet.

User equipment 1600 incorporates a communication subsystem 1611, including both a receiver 1612 and a transmitter 1614, as well as associated components such as one or more, preferably embedded or internal, antenna elements 1616 and 1618, local oscillators (LOs) 1613, and a processing module such as a digital signal processor (DSP) 1620. As will be apparent to those skilled in the field of communications, the particular design of the communication subsystem 1611 will be dependent upon the communication network in which the device is intended to operate.

An LTE user equipment may require a removable user identity module (RUIM) or a subscriber identity module (SIM) card in order to operate on a network. The SIM/RUIM interface 1644 is normally similar to a card-slot into which a SIM/RUIM card can be inserted and ejected like a diskette or PCMCIA card. The SIM/RUIM card can have approximately 64K of memory and hold many key configuration 1651, and other information 1653 such as identification, and subscriber related information.

When required network registration or activation procedures have been completed, user equipment 1600 may send and receive communication signals over a network 1619. As illustrated in FIG. 16, network 1619 can consist of multiple base stations communicating with the user equipment.

Signals received by antenna 1616 through communication network 1619 are input to receiver 1612, which may perform such common receiver functions as signal amplification, frequency down conversion, filtering, channel selection and the like, and in the example system shown in FIG. 16, analog to digital (A/D) conversion. A/D conversion of a received signal allows more complex communication functions such as demodulation and decoding to be performed in the DSP 1620. In a similar manner, signals to be transmitted are processed, including modulation and encoding for example, by DSP 1620 and input to transmitter 1614 for digital to analog conversion, frequency up conversion, filtering, amplification and transmission over the communication network 1619 via antenna 1618. DSP 1620 not only processes communication signals, but also provides for receiver and transmitter control. For example, the gains applied to communication signals in receiver 1612 and transmitter 1614 may be adaptively controlled through automatic gain control algorithms implemented in DSP 1620.

User equipment 1600 preferably includes a microprocessor 1638 which controls the overall operation of the device. Communication functions, including at least data and voice communications, are performed through communication subsystem 1611. Microprocessor 1638 also interacts with further device subsystems such as the display 1622, flash memory 1624, random access memory (RAM) 1626, auxiliary input/output (I/O) subsystems 1628, serial port 1630, one or more keyboards or keypads 1632, speaker 1634, microphone 1636, other communication subsystem 1640 such as a short-range communications subsystem and any other device subsystems generally designated as 1642. Serial port 1630 could include a USB port or other port known to those in the art.

Some of the subsystems shown in FIG. 16 perform communication-related functions, whereas other subsystems may provide "resident" or on-device functions. Notably, some subsystems, such as keyboard 1632 and display 1622, for example, may be used for both communication-related functions, such as entering a text message for transmission over a communication network, and device-resident functions such as a calculator or task list.

Operating system software used by the microprocessor 1638 is preferably stored in a persistent store such as flash memory 1624, which may instead be a read-only memory (ROM) or similar storage element (not shown). Those skilled in the art will appreciate that the operating system, specific device applications, or parts thereof, may be temporarily loaded into a volatile memory such as RAM 1626. Received communication signals may also be stored in RAM 1626.

As shown, flash memory 1624 can be segregated into different areas for both computer programs 1658 and program data storage 1650, 1652,1654 and 1656. These different storage types indicate that each program can allocate a portion of flash memory 1624 for their own data storage requirements. Microprocessor 1638, in addition to its operating system functions, preferably enables execution of software applications on the user equipment. A predetermined set of applications that control basic operations, including at least data and voice communication applications for example, will normally be installed on user equipment 1600 during manufacturing. Other applications could be installed subsequently or dynamically.

A preferred software application may be a personal information manager (PIM) application having the ability to organize and manage data items relating to the user of the user equipment such as, but not limited to, e-mail, calendar events, voice mails, appointments, and task items. Naturally, one or more memory stores would be available on the user equipment to facilitate storage of PIM data items. Such PIM application would preferably have the ability to send and receive data items, via the wireless network 1619. In a preferred embodiment, the PIM data items are seamlessly integrated, synchronized and updated, via the wireless network 1619, with the user equipment user's corresponding data items stored or associated with a host computer system. Further applications may also be loaded onto the user equipment 1600 through the network 1619, an auxiliary I/O subsystem 1628, serial port 1630, short-range communications subsystem 1640 or any other suitable subsystem 1642, and installed by a user in the RAM 1626 or preferably a non-volatile store (not shown) for execution by the microprocessor 1638. Such flexibility in application installation increases the functionality of the device and may provide enhanced on-device functions, communication-related functions, or both. For example, secure communication applications may enable electronic commerce functions and other such financial transactions to be performed using the user equipment 1600.

In a data communication mode, a received signal such as a text message or web page download will be processed by the communication subsystem 1611 and input to the microprocessor 1638, which preferably further processes the received signal for output to the display 1622, or alternatively to an auxiliary I/O device 1628.

A user of user equipment 1600 may also compose data items such as email messages for example, using the keyboard 1632, which is preferably a complete alphanumeric keyboard or telephone-type keypad, in conjunction with the display 1622 and possibly an auxiliary I/O device 1628. Such composed items may then be transmitted over a communication network through the communication subsystem 1611.

For voice communications, overall operation of user equipment 1600 is similar, except that received signals would preferably be output to a speaker 1634 and signals for transmission would be generated by a microphone 1636. Alternative voice or audio I/O subsystems, such as a voice message recording subsystem, may also be implemented on user equipment 1600. Although voice or audio signal output is preferably accomplished primarily through the speaker 1634, display 1622 may also be used to provide an indication of the identity of a calling party, the duration of a voice call, or other voice call related information for example.

Serial port 1630 in FIG. 16 would normally be implemented in a personal digital assistant (PDA)-type user equipment for which synchronization with a user's desktop computer (not shown) may be desirable, but is an optional device component. Such a port 1630 would enable a user to set preferences through an external device or software application and would extend the capabilities of user equipment 1600 by providing for information or software downloads to user equipment 1600 other than through a wireless communication network. The alternate download path may for example be used to load an encryption key onto the device through a direct and thus reliable and trusted connection to thereby enable secure device communication. As will be appreciated by those skilled in the art, serial port 1630 can further be used to connect the mobile device to a computer to act as a modem.

Other communications subsystems 1640, such as a short-range communications subsystem, is a further optional component which may provide for communication between user equipment 1600 and different systems or devices, which need not necessarily be similar devices. For example, the subsystem 1640 may include an infrared device and associated circuits and components or a Bluetooth™ communication module to provide for communication with similarly enabled systems and devices.

Figure 17:
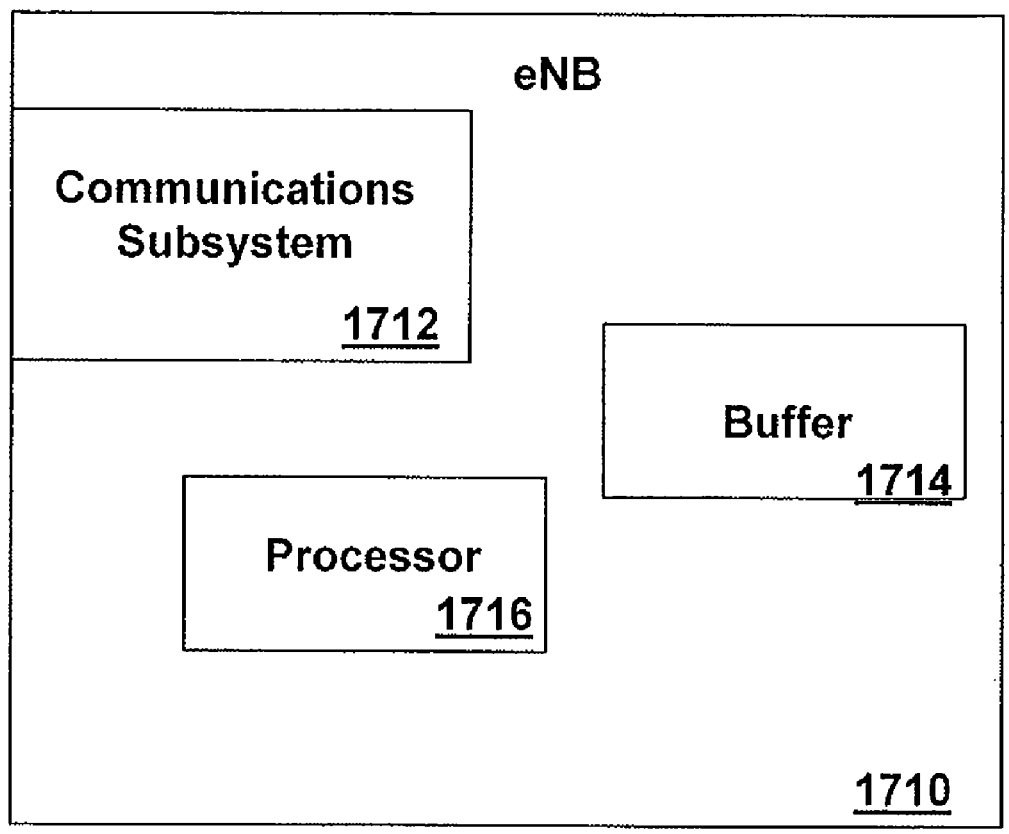
FIG. 17 is a block diagram illustrating a simplified enhanced Node B adapted to be used with the methods of the present disclosure.

Referring to FIG. 17, a simplified enhanced Node B 1710 is provided. Enhanced Node B 1710 includes a communications subsystem 1712 for signaling to user equipment and further for receiving data from a network.

Enhanced Node B further includes a buffer 1714 to store data that is to be passed to a UE.

Enhanced Node B further includes a processor 1716 adapted to track data in buffer 1714 and further to initiate signaling and process responses in accordance with the embodiment of FIGS. 1 to 15 herein.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods.

The invention claimed is:

1. A method for recovery from discontinuous reception desynchronization, the method comprising the steps of:
   determining a most recent time that an explicit message indicating a change from an old discontinuous reception period to a new discontinuous reception period was sent;
   adding to the most recent time that the explicit message was sent the old discontinuous reception period multiplied by an integer, where the integer is selected to ensure the results of the adding step occur after a present time; and
   sending, from an enhanced Node B, a continuous reception command at the time found in the adding step.

2. The method of claim 1, wherein the continuous reception command is sent to a user equipment.

3. The method of claim 2, wherein the desynchronization is detected through the steps of:
   sending data from the enhanced Node B to the user equipment; and
   receiving no response from the user equipment.

4. The method of claim 2, further comprising the steps of:
   receiving, at the user equipment, the continuous reception command; and
   transitioning into a continuous reception mode.

5. The method of claim 1, wherein if desynchronization still exists after said continuous reception command is sent, the method further comprising the steps of:
   waiting for a pre-configured absolute wake-up time before sending a continuous reception command.

6. A method for recovery from discontinuous reception desynchronization during implicit changing to a new discontinuous reception period, the method comprising the steps of:
   finding a time of a second last message that an enhanced Node B considers to be successfully sent;

determining an elapsed time from the time of the second last message to the present time;

deriving the longest transition time interval available based on the result of the determining step;

adding the time of the second last message to the longest transition time interval available and further adding a discontinuous reception period duration utilized in the longest transition time interval available multiplied by an integer, where the integer is selected to ensure the results of the adding step are a time subsequent to a current time; and sending, from an enhanced Node B, a continuous reception command at the time found in the adding step.

7. The method of claim 6, wherein the continuous reception command is sent to a user equipment.

8. The method of claim 7, wherein the desynchronization is detected through the steps of:

sending data from the enhanced Node B to the user equipment; and receiving no response from the user equipment.

9. The method of claim 7, further comprising the steps of:

receiving, at the user equipment, the continuous reception command; and transitioning into a continuous reception mode.

10. The method of claim 6, wherein if desynchronization still exists after said continuous reception command is sent, the method further comprising the steps of:

waiting for a preconfigured absolute wake-up time before sending a continuous reception command.

11. An enhanced Node B adapted for recovery from discontinuous reception desynchronization, the enhanced Node B comprising:

means for determining a most recent time that the explicit message was sent;

means for adding to the most recent time that the explicit message was sent the old discontinuous reception period multiplied by an integer, where the integer is selected to ensure the results of the adding means occur after a present time; and communications subsystem for sending a continuous reception command at the time found by the adding means.

12. The enhanced Node B of claim 11, wherein the communications subsystem sends the continuous reception to a user equipment.

13. The enhanced Node B of claim 12, wherein the enhanced node B is adapted to detect desynchronization utilizing the communications subsystem to send data from the enhanced Node B to the user equipment, wherein desynchronization is detected by receiving no response from the user equipment.

14. The enhanced Node B of claim 11, wherein if desynchronization still exists after said continuous reception command is sent, further comprising:

means for waiting for a preconfigured absolute wake-up time before sending a continuous reception command.

15. An enhanced Node B for recovery from discontinuous reception desynchronization during implicit changing to a new discontinuous reception period, the enhanced Node B comprising:

means for finding a time of a second last message that an enhanced Node B considers to be successfully sent;

means for determining an elapsed time from the time of the second last message to the present time;

means for deriving the longest transition time interval available based on the result of the determining means;

means for adding the time of the second last message to the longest transition time interval available and further adding a discontinuous reception period duration utilized in the longest transition time interval available multiplied by an integer, where the integer is selected to ensure the results of the adding means are a time subsequent to a current time; and communications subsystem for sending a continuous reception command at the time found by the adding means.

16. The enhanced Node B of claim 15, wherein the communications subsystem is adapted to send the continuous reception command to a user equipment.

17. The enhanced Node B of claim 16, wherein the enhanced Node B is adapted to detect desynchronization utilizing the communications subsystem to send data from the enhanced Node B to the user equipment;

wherein desynchronization is detected if no response is received from the user equipment.

18. The enhanced Node B of claim 17, wherein if desynchronization still exists after said continuous reception command is sent, further comprising:

means for waiting for a preconfigured absolute wake-up time before sending a continuous reception command.

* * * * *